United States Patent
Maier

[15] 3,694,950
[45] Oct. 3, 1972

[54] SLIDING COVER APPARATUS FOR ICE FISHING HOLE

[72] Inventor: Charles W. Maier, 107 Oscar Ave. N., Canby, Minn. 56220

[22] Filed: June 9, 1971

[21] Appl. No.: 151,173

[52] U.S. Cl. .............................43/4, 49/272, 49/379
[51] Int. Cl. ...................................A01k 97/00
[58] Field of Search .....43/4, 4.5, 15, 16, 17; 49/272, 49/379

[56] References Cited

UNITED STATES PATENTS

| | | | |
|---|---|---|---|
| 3,030,122 | 4/1962 | Madera | 43/4 X |
| 3,134,186 | 5/1964 | Krueger | 43/4 X |
| 3,466,781 | 9/1969 | Nelson et al. | 43/4 |
| 3,481,064 | 12/1969 | Newman | 43/4 |
| 3,170,458 | 2/1965 | Anderlie | 43/4 UX |

Primary Examiner—Samuel Koren
Assistant Examiner—James H. Czerwonky
Attorney—Williamson, Palmatier & Bains, H. Dale Palmatier, Herman H. Bains, Malcolm L. Moore and Conrad A. Hansen

[57] ABSTRACT

An ice fishing accessory and safety appliance for an ice fishing hole, the apparatus having a stationary frame surrounding the hole and supported in a substantially horizontal plane relative to the ice. A movable cover mounted for sliding movement along a pair of substantially parallel guideways of the frame moves between an open position permitting access to the hole and a closed position obstructing the hole so a captured fish withdrawn from the ice hole cannot re-enter the hole and a fisherman will not accidentally slip through the hole. A pair of tensioned springs connected between movable cover and stationary frame move the cover from an open position to a closed position when a foot pedal actuated latch on the frame is released by the fisherman.

6 Claims, 3 Drawing Figures

PATENTED OCT 3 1972 3,694,950

INVENTOR.
Charles W. Maier
BY Williamson, Palmatier
& Bains
ATTORNEYS

3,694,950

SLIDING COVER APPARATUS FOR ICE FISHING HOLE

BACKGROUND OF THE INVENTION

Most ice fishing activity occurs during cold winter weather and exposes participants to low temperatures, chilling winds, and slippery conditions associated with the ice.

After an ice fisherman hooks a fish and withdraws it from the ice hole he often encounters problems in preventing escape of the fish. The heavy gloves or mittens required by adverse weather conditions and the treacherous footing afforded by the ice coupled with the inherently slippery nature of the fish make it difficult to rapidly seize the fish or control its flopping movements. As soon as the fish is withdrawn from water, the buoyant force of the lake water which had previously supported much of the fish's weight is no longer present and all the fish's weight is applied to dislodge the fish hook and break the fish line. This sudden increase of applied force often causes the hook to dislodge from the fish's mouth or the line to break, resulting in the fish being free to move toward and often successfully escape into the ice hole. The hasty movements and efforts required of a fisherman to secure a fish under adverse weather conditions and on slippery ice can easily lead to injury producing mishaps such as the fisherman slipping or falling on the ice or sliding into the ice hole. A well earned fish often may escape into the ice hole during the struggle. Even when an ice house is used, a fisherman can have a foot or leg slip into the ice hole while trying to secure a captured fish or the fish may escape into the hole before it can be secured.

SUMMARY OF THE INVENTION

The invention comprises an ice fishing apparatus for covering an ice hole to prevent escape of captured fish therethrough and to keep an ice fisherman from slipping through the hole. The apparatus has a stationary frame surrounding the hole and supported in a horizontal plane on the ice or on the floor of an ice house. The frame includes a pair of parallel guideways along which a spring loaded cover is mounted for sliding movement between an open position permitting a fishing line to be extended through the frame and into the ice hole and a closed position where the cover obstructs the hole. A foot pedal actuated latch on the frame permits the fisherman to trigger the closing of the cover over the ice hole by merely depressing the pedal with his foot thus leaving his hands free to secure the fish. A resilient bumper on the frame confronts and receives the rapidly closing cover so as to absorb shock and diminish unwanted noise, the bumper also spacing the cover from the frame to prevent damage to a fishing line if it accidentally remains in the hole when the cover moves to a closed position.

The frame of the invention surrounds the ice hole and provides a barrier which effectively intercepts a fisherman's foot before it can slip into the ice hole. When a fish is hooked and withdrawn from the hole, the fisherman immediately steps on the foot pedal and closes the cover thereby diminishing any possibility of the fish slipping through the hole and eliminating any need for haste in securing the captured fish; in addition the possibility of the fisherman thereafter slipping into the hole is completely eliminated. The invention is usable on a frozen lake or river surface or on the floor of an ice house. It is simple and economical to manufacture, sturdy, extremely reliable, and light enough in weight to permit it to be carried to and from a fishing location on a lake.

DESCRIPTION AND OPERATION OF THE INVENTION

Figure 1:
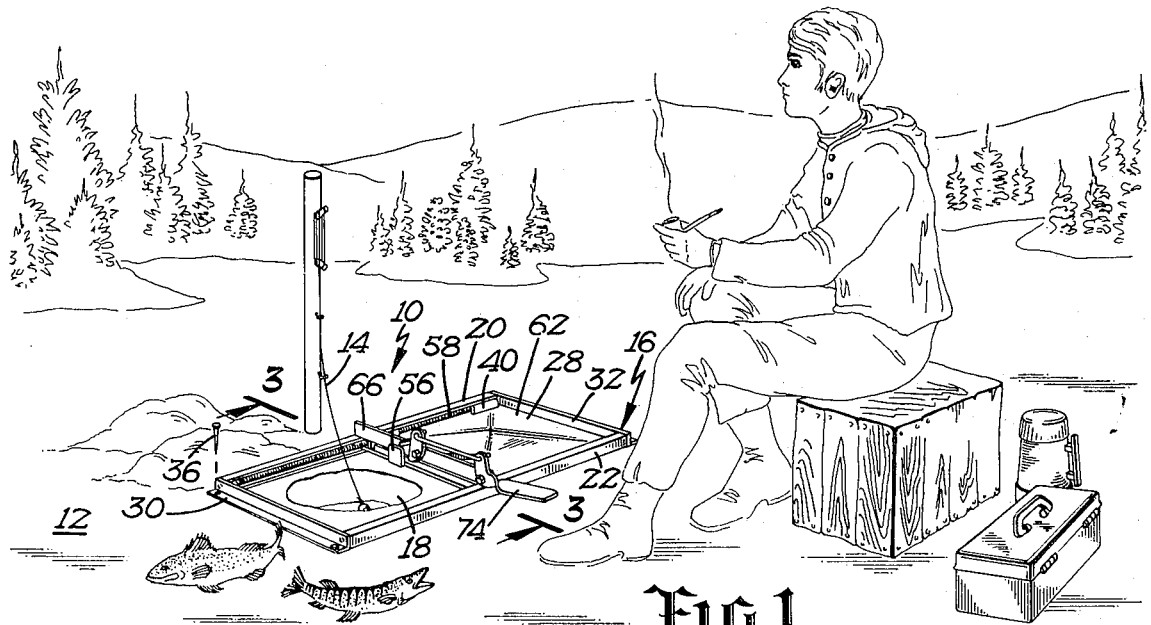
FIG. 1 is a pictorial view showing the invention in use on a frozen lake.

Referring now to FIG. 1, the invention 10 is shown supported by the ice 12 of a frozen lake, lying thereon in a substantially horizontal plane. A fishing line 14 is passed through the frame 16 of the invention 10 and into a hole 18 in the ice.

Figure 2:
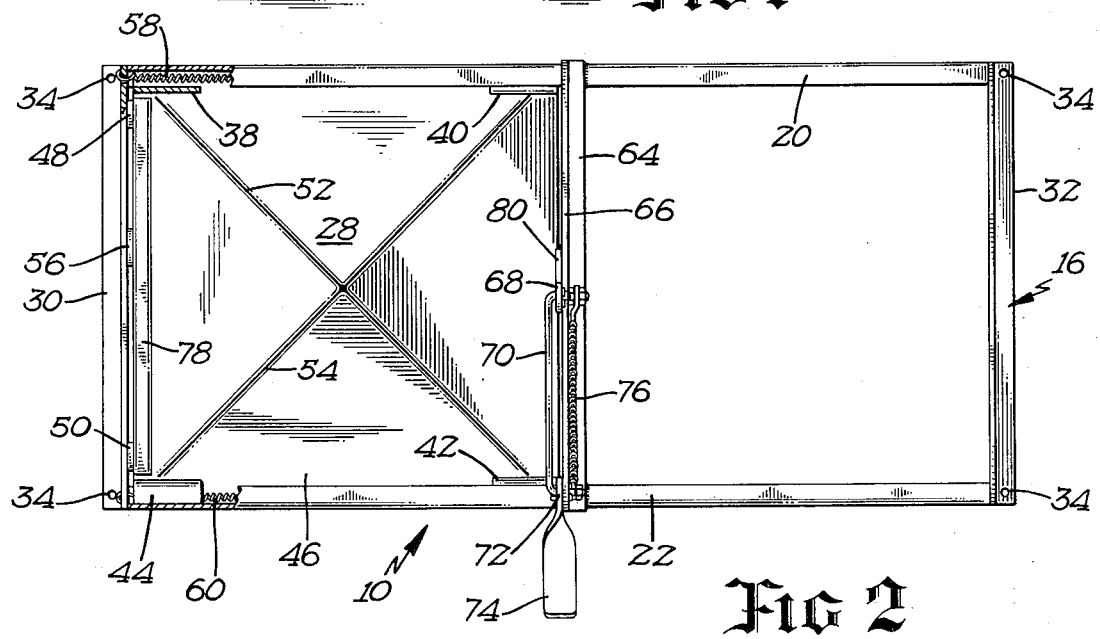
FIG. 2 is a top elevational view of the invention with sections of the frame cut away to show the springs which close the cover.
Figure 3:
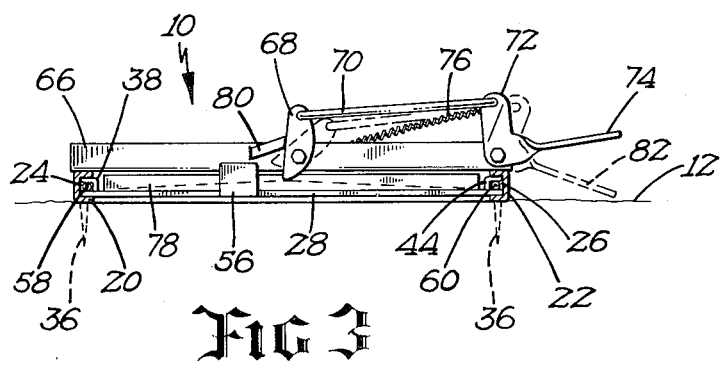
FIG. 3 is a cross-sectional view of the invention taken along cutting plate 3—3 of FIG. 1 showing the structure and operation of the foot pedal actuated latch.

Referring now to FIG. 2, the frame 16 of the invention has a pair of substantially parallel side channels 20 and 22, each channel having a U-shaped cross-section, best shown in FIG. 3, which forms guideways 24 and 26 along and between which cover 28 is arranged for sliding movement. Frame cross bars 30 and 32 interconnect the ends of the side channels 20 and 22 at right angles thereto and are rigidly joined to the side channels in any known manner. The frame 16 has an aperture 34 at each corner thereof to permit the frame to be firmly attached to the ice. The side channels and cross bars form the frame 16 which surrounds an ice hole 18 over which it is positioned, thereby providing a barrier against which a fisherman's foot will lodge before slipping into the ice hole. The frame may be formed from any of a variety of materials inter alia wood, metal or plastic. For purposes of this disclosure the term "ice" shall be construed to cover either a frozen lake surface or the floor of an ice house since the invention can be used in either environment.

The frame 16 is anchored to the ice 12 by means of a plurality of anchors such as metal spike 36 (FIGS. 1 and 3) which is passed through aperture 34 and driven into the ice. The invention may be attached to the ice or to the floor of an ice house with any of a variety of different anchors and fasteners known to the art.

The cover 28 is provided with guides 38, 40, 42 and 44 which cooperate with guideways 24 and 26 to permit cover 28 to slide smoothly therealong. The cover 28, when in a closed position 46 shown by solid lines in FIG. 2 obstructs the ice hole. The closed cover is spaced from the cross bar 30 by combined bumpers and spacers 48 and 50 which absorb shock associated with closing and eliminate unwanted noise which might otherwise frighten nearby fish. In addition, they space the cover from cross bar 30 to prevent damage to a fish line in the event the line is accidentally left in the ice hole when the cover is closed.

The cover is creased at 52 and 54 to provide additional rigidity and strength. An upright handle 56 extends from the cover and permits easier moving of the cover by an operator. The cover may be formed of a solid material such as metal, wood, plastic, or alternatively may consist of a mesh or screenlike material.

A pair of springs 58 and 60 extend between an end of the frame and cover 28, being attached to frame 16 adjacent cross bar 30 in any known manner so that when cover 28 is moved to an open position 62 shown in FIG. 1, the springs are stretched to generate a restoring force which urges cover 28 to a closed position 46 (FIG. 2) unless the cover is retained in an open position by the latch which will next be described.

A latch mounting bracket 64 (FIGS. 2 and 3) interconnects side channels 20 and 22, the mounting bracket having an upright flange 66. A latch 68 is pivotally connected to flange 66 and a linkage 70 extends from latch 68 to an ear 72 of foot pedal 74, which is pivotally mounted to flange 66 near side channel 22. A spring 76 extending between ear 72 and flange 66 retains the foot pedal 74 in an upright position wherein the latch 68 cooperates with keeper 78 on the cover to obstruct sliding movement of cover 28 and retain it in an open position. A stop 80 limits the travel to latch 68 and cooperates with spring 76 to keep latch 68 in a position obstructing movement to cover 28 from open to closed position.

When the foot pedal 74 is depressed to a releasing position 82 shown in FIG. 3 by dotted lines linkage 70 and latch 68 are swung to the shown position where latch 68 is clear of keeper 78 and the cover 28 is free to move to a closed position. The foot pedal makes it possible for a fisherman to quickly and easily operate the invention without using his hands.

In operation, a fisherman carries the invention 10 to the ice fishing location, chops a hole in the ice, and then positions the invention about the hole so frame 16 surrounds the ice hole, the hole being located between cross bar 30 and bracket 64. He then drives a plurality of anchors 36 through apertures 34 and into the ice to retain the frame in a stationary horizontal position relative to the ice. The foot pedal 74 is depressed to move latch 68 clear of keeper 78 and the cover 28 is moved from closed position 46 to open position 62 to tension springs 58 and 60 which generate a restoring force. The cover is retained in open position by latch 68 as soon as the pedal is released and returned to an upright position by spring 76. The fisherman lowers fishing line 14 through the frame and into the ice hole and begins fishing. The frame 16 creates a barrier which surrounds ice hole 18 and greatly reduces the risk that a fisherman's foot may slip along the ice and into the hole 18.

When a fish is hooked, the fisherman pulls the fish from the ice hole 18 and immediately depresses foot pedal 74 which moves linkage 70 and latch 68 to releasing position 82 shown in dotted lines in FIG. 3. This movement releases cover 28. Since the springs 58 and 60 are already tensioned by the cover being in an open position, the spring restoring force propels cover 28 to closed position 46 (FIG. 2), completely obstructing the ice hole. The cover strikes combined bumpers and spacers 48 and 50 which absorb the shock and noise associated with closing so as to avoid frightening nearby fish. The bumpers provide spacing between cross bar 30 and cover 28 so that if the cover is inadvertently closed while a fishing line is passed therethrough and into the ice hole, the line is merely urged into the gap between cover and bar 30 so that there is no danger of cutting the line.

After the cover is closed, there is no chance of the hooked fish re-entering the hole and escaping. Even if the fish manages to dislodge the hook, it is forced to remain on the surface of the ice where the fisherman can catch it at his leisure. In addition since the ice hole is obstructed by cover 28 there is no danger of the fisherman inadvertently stepping or slipping into the hole. It should be understood that the invention may also be permanently installed in an ice house if desired and, of course, can be made in a wide variety of sizes adapted to particular ice houses.

Accordingly the invention provides a simple, reliable, inexpensive structure which prevents the escape of captured fish and greatly reduces the chance of injury to a fisherman.

While the preferred embodiments of the present invention have been described, it should be understood that various changes, adaptations and modifications may be made therein without departing from the spirit of the invention and the scope of the appended claims.

What is claimed is:

1. A sliding cover apparatus for an ice fishing hole to prevent an ice fisherman from slipping through the hole and to prevent escape of captured fish through the hole comprising:
   a stationary frame supported in a substantially horizontal plane relative to the ice, the frame including a pair of substantially parallel guideways;
   a plurality of anchors for retaining the frame in said horizontal plane and stationary relative to the hole;
   a movable cover mounted for sliding movement along the guideways between an open position permitting access to the hole and a closed position wherein the cover obstructs the hole so that a captured fish withdrawn from the hole is prevented from re-entering the hole and a fisherman can not slip through the hole;
   a foot pedal actuated latch on the frame arranged to prevent movement of the cover from an open position to a closed position when the pedal is undepressed and to permit movement of the cover to a closed position when the foot pedal is depressed; and
   spring means extending between the frame and the cover and exerting force on the cover when the cover is in open position so as to move the cover to a closed position when the foot pedal is depressed, the spring means located wholly within the said frame.

2. The combination according to claim 1 wherein said spring means includes a pair of springs, one spring extending along and within each guideway and attached between the said stationary frame and the said movable cover.

3. The combination according to claim 1 and further including a combined stationary resilient bumper and spacer attached to said frame and arranged to confront and receive the cover so as to absorb shock and diminish unwanted noise when the cover slides to a closed position the bumper being constructed to slightly space the cover from the frame to prevent damage to fishing lines inadvertently remaining in the hole when the cover moves to closed position.

4. The combination according to claim 3 wherein said frame is a rectangular frame including a pair of cross bars interconnecting ends of the guideways and transverse thereto, the said bumper being on the cross bar toward which the cover slides when moving to a closed position.

5. The combination according to claim 1 wherein the frame provides a continuous barrier about the edge of the ice hole to intercept entry of a fisherman's foot into the ice hole.

6. A sliding cover apparatus for an ice fishing hole to prevent escape of a captured fish through the hole comprising:

a stationary frame supported in a substantially horizontal plane relative to the ice, the frame including a pair of substantially parallel guideways;

a movable cover mounted for sliding movement along the guideways between an opened position permitting access to the hole and a closed position wherein the cover obstructs the hole so that a captured fish withdrawn from the hole is prevented from re-entering the hole;

a latch on the frame arranged to prevent movement of the cover from an open position to a closed position when the latch is in an obstructing position; and spring means extending between the frame and the cover and arranged to be under tension when the cover is in an open position so as to move the cover to a closed position when the latch is no longer in an obstructing position.

* * * * *